(12) United States Patent
Fukumoto et al.

(10) Patent No.: US 8,308,847 B2
(45) Date of Patent: Nov. 13, 2012

(54) FILTER FOR REMOVING A SULFUR-CONTAINING-GAS AND METHOD FOR REMOVING A SULFUR-CONTAINING-GAS USING THE SAME

(75) Inventors: Kazuhiro Fukumoto, Nagoya (JP); Minoru Takahara, Aichi-gun (JP); Kenichirou Suzuki, Owariasahi (JP); Nobuhiko Nakagaki, Nagoya (JP); Yasunari Arai, Takahama (JP); Minoru Honda, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 530 days.

(21) Appl. No.: 12/529,769

(22) PCT Filed: Jan. 24, 2008

(86) PCT No.: PCT/JP2008/050941
§ 371 (c)(1),
(2), (4) Date: Sep. 3, 2009

(87) PCT Pub. No.: WO2008/117557
PCT Pub. Date: Oct. 2, 2008

(65) Prior Publication Data
US 2010/0024642 A1    Feb. 4, 2010

(30) Foreign Application Priority Data
Mar. 28, 2007   (JP) ................. 2007-085083

(51) Int. Cl.
*B01D 53/02* (2006.01)
(52) U.S. Cl. ............... 95/135; 55/486; 55/524; 96/134; 96/154
(58) Field of Classification Search ........... 95/129, 95/135, 137, 90; 423/210, 224, 244.03, 239.1, 423/525, 545; 502/26, 27, 181, 231, 432, 502/517
See application file for complete search history.

(56) References Cited

U.S. PATENT DOCUMENTS 2,121,793 A * 6/1938 Goshorn et al. ............ 423/224
(Continued)

FOREIGN PATENT DOCUMENTS

DE    1 952 346    4/1971
(Continued)

OTHER PUBLICATIONS

Japan Office action that issued with respect to patent family member Japanese Patent Application No. 2007-085083, dated Nov. 22, 2011 along with an english translation thereof.
(Continued)

*Primary Examiner* — Duane Smith
*Assistant Examiner* — Minh-Chau Pham
(74) *Attorney, Agent, or Firm* — Greenblum & Bernstein, P.L.C.

(57) ABSTRACT

Provided is a filter for removing a sulfur-containing-gas (1), which removes the sulfur-containing-gas by being brought into contact with the sulfur-containing-gas in a gas flow path, the filter including a former filter (11) disposed on an upstream side of the gas flow path, and a latter filter (12) disposed on a downstream side of the gas flow path, wherein the former filter (11) includes a first material for removing a sulfur-containing-gas, the first material including a porous support, and iodine which is supported on the porous support, and is produced by catalytic pyrolysis of ammonium iodide at a thermal decomposition ratio of 80% or more by use of the porous support as a catalyst, and the latter filter (12) includes a second material for removing a sulfur-containing-gas, the second material including an activated carbon fiber, and an alkali component which is supported on the activated carbon fiber.

10 Claims, 3 Drawing Sheets

U.S. PATENT DOCUMENTS

| | | | | |
|---|---|---|---|---|
| 3,050,363 | A * | 8/1962 | Veal | 502/181 |
| 3,502,427 | A * | 3/1970 | Friedrich | 95/129 |
| 3,578,390 | A * | 5/1971 | Kruel et al. | 423/244.03 |
| 3,766,090 | A * | 10/1973 | Juntgen et al. | 502/26 |
| 3,961,020 | A * | 6/1976 | Seki | 423/239.1 |
| 5,344,626 | A * | 9/1994 | Abler | 423/210 |
| 5,446,005 | A | 8/1995 | Endo | |
| 7,699,906 | B2 * | 4/2010 | Messier | 95/90 |
| 2005/0229562 | A1 * | 10/2005 | Dallas et al. | 55/486 |
| 2008/0314821 | A1 | 12/2008 | Ohashi et al. | |
| 2011/0259191 | A1 * | 10/2011 | Hauville | 95/90 |

FOREIGN PATENT DOCUMENTS

| | | |
|---|---|---|
| JP | 62-183838 | 8/1987 |
| JP | 5-23588 | 2/1993 |
| JP | 6-17321 | 1/1994 |
| JP | 7-60056 | 3/1995 |
| JP | 9-155187 | 6/1997 |
| JP | 11-347398 | 12/1999 |
| JP | 2001-276198 | 10/2001 |
| JP | 2002-28415 | 1/2002 |
| JP | 2002-369869 | 12/2002 |
| JP | 2003-102818 | 4/2003 |
| JP | 2006-341150 | 12/2006 |

OTHER PUBLICATIONS

Henning et al. "Impregnated activated carbon for environmental protection." Gas Separation & Purification, vol. 7, No. 4, pp. 235-240, 1993.

Extended European Search report issued with respect to European Patent Application No. 08703770.1, dated Apr. 1, 2011.

International Preliminary Report on Patentability for PCT/JP2008/050941, mailed Apr. 22, 2010.

English language Abstract of JP 2002-369869, Dec. 24, 2002.
English language Abstract of JP 5-23588, Feb. 2, 1993.
English language Abstract of JP 9-155187, Jun. 17, 1997.
English language Abstract of JP 2002-28415, Jan. 29, 2002.
English language Abstract of JP 62-183838, Aug. 12, 1987.
English language Abstract of JP 7-60056, Mar. 7, 1995.
English language Abstract of JP 11-347398, Dec. 21, 1999.
English language Abstract of JP 2001-276198, Oct. 9, 2001.
English language Abstract of JP 2006-341150, Dec. 21, 2006.

* cited by examiner

FILTER FOR REMOVING A SULFUR-CONTAINING-GAS AND METHOD FOR REMOVING A SULFUR-CONTAINING-GAS USING THE SAME

TECHNICAL FIELD

The present invention relates to a filter for removing a sulfur-containing-gas and a method for removing a sulfur-containing-gas using the same, and more specifically relates to: a filter for removing a sulfur-containing-gas which removes a sulfur-containing-gas by being brought into contact with the sulfur-containing-gas; and a method for removing a sulfur-containing-gas using the same.

BACKGROUND OF THE INVENTION

Conventionally, activated carbons have been utilized to remove harmful gases. In recent years, in order to further improve the gas removing capabilities of such activated carbons, various materials for removing a sulfur-containing-gas, in which attached substances such as metal compounds and halogen compounds are supported on activated carbons, have been disclosed.

For example, Japanese Unexamined Patent Application Publication No. Hei 11-347398 (Document 1) discloses an material for removing a acidic-gas in which 10 to 30 parts by mass of an alkali metal carbonate is supported on an activated carbon. Moreover, Japanese Unexamined Patent Application Publication No. 2001-276198 (Document 2) discloses a material for removing a sulfur-containing-gas in which iodine and/or at least one kind of an iodide are supported on an activated carbon whose volume of pores with pore diameters of 500 Å or more is 0.1 mL/g or more. However, conventional materials for removing a sulfur-containing-gas as described in Documents 1 and 2 do not necessarily have sufficient sulfur-containing-gas removal performance. Moreover, when these materials for removing a sulfur-containing-gas are used, the sufficient sulfur-containing-gas removal performance cannot be exhibited for a long period of time.

DISCLOSURE OF THE INVENTION

The present invention has been made in view of the problems of the conventional techniques. An object of the present invention is to provide: a filter for removing a sulfur-containing-gas capable of exhibiting sufficiently high sulfur-containing-gas removal performance and also capable of exhibiting the sufficiently high sulfur-containing-gas removal performance for a long period of time; and a method for removing a sulfur-containing-gas using the filter for removing a sulfur-containing-gas.

The present inventors have earnestly studied in order to achieve the above object. As a result, the present inventors have revealed the following fact, and this discovery has led the present inventors to complete the present invention, that is, a filter for removing a sulfur-containing-gas comprising: a former filter comprising a first material for removing a sulfur-containing-gas in which iodine produced by catalytic pyrolysis of ammonium iodide at a thermal decomposition ratio of 80% or more is supported on a porous support; and a latter filter comprising a second material for removing a sulfur-containing-gas which comprises an activated carbon fiber and an alkali component supported on the activated carbon fiber. The filter for removing a sulfur-containing-gas is capable of exhibiting sufficiently high sulfur-containing-gas removal performance and also capable of exhibiting the sufficiently high sulfur-containing-gas removal performance for a long period of time.

Specifically, the filter for removing a sulfur-containing-gas of the present invention is a filter for removing a sulfur-containing-gas, which removes the sulfur-containing-gas by being brought into contact with the sulfur-containing-gas in a gas flow path, the filter comprising a former filter disposed on an upstream side of the gas flow path, and a latter filter disposed on a downstream side of the gas flow path, wherein the former filter comprises a first material for removing a sulfur-containing-gas, the first material comprising a porous support, and iodine which is supported on the porous support, and is produced by catalytic pyrolysis of ammonium iodide at a thermal decomposition ratio of 80% or more by use of the porous support as a catalyst, and the latter filter comprises a second material for removing a sulfur-containing-gas, the second material comprising an activated carbon fiber, and an alkali component which is supported on the activated carbon fiber.

In the filter for removing a sulfur-containing-gas of the above-described present invention, the iodine is preferably produced by the catalytic pyrolysis of ammonium iodide at the thermal decomposition ratio of 90% or more by use of the porous support as the catalyst.

The porous support according to the present invention is preferably an activated carbon, and more preferably an activated carbon in which a proportion of a pore volume attributable to micropores with diameters of 2 nm or smaller is 90% or more relative to a total pore volume in the activated carbon.

In addition, a supported amount of the iodine according to the present invention is preferably 10 to 100 parts by mass, and more preferably 20 to 60 parts by mass, relative to 100 parts by mass of the porous support.

Moreover, the alkali component according to the above-described present invention is preferably at least one selected from the group consisting of potassium carbonate, sodium carbonate and lithium carbonate.

Further, a supported amount of the alkali component according to the above-described present invention is preferably 10 to 100 parts by mass, and more preferably 5 to 60 parts by mass, relative to 100 parts by mass of the activated carbon fiber.

Meanwhile, the method for removing a sulfur-containing-gas of the present invention is a method comprising a step of bringing the sulfur-containing-gas into contact with the filter for removing a sulfur-containing-gas of the above-described present invention to thereby remove the sulfur-containing-gas.

Note that, a reason why the filter for removing a sulfur-containing-gas of the present invention achieves the above object is not exactly known; however, the present inventors speculate as follows. Specifically, the former filter according to the present invention comprises the first material for removing a sulfur-containing-gas in which the iodine produced by the catalytic pyrolysis of ammonium iodide at the thermal decomposition ratio of 80% or more is supported on the activated carbon. The catalytic pyrolysis of ammonium iodide will be discussed. In the catalytic pyrolysis, first, ammonium iodide ($NH_4I$) is catalytically and thermally decomposed by the porous support (catalyst). Thereby, hydroiodic acid (HI) and ammonia ($NH_3$) are produced. Such hydroiodic acid has a strong reducing power. For this reason, hydroiodic acid is readily oxidized by oxygen under an oxygen-containing atmosphere. When hydroiodic acid is oxidized in this way, solid iodine ($I_2$) is produced. The produced iodine remains supported on the porous support which has functioned as the catalyst. Note that, ammonia produced along with hydrogen iodide is a substance with a high polarity. Thus, the ammonia hardly adsorbs to the porous support, which has a non-polar property, and is readily removed by heat. For this reason, as a result of such catalytic pyrolysis of ammonium iodide, only iodine is supported on the porous support. Further, in the present invention, the thermal decomposition ratio of ammonium iodide in such catalytic pyrolysis is 80% or more. Accordingly, iodine is supported at a sufficient supported amount. Moreover, in the present invention, ammonium iodide, which is highly soluble in a solvent such as water, is used as the iodine source. Accordingly, ammonium iodide is supported on the porous support by impregnation in the form of fine particles. The iodine produced by the catalytic pyrolysis of the ammonium iodide and supported on the porous support takes in the form of further sufficiently fine particles while being highly dispersed on the porous support. The present inventors speculate that, for this reason, the first material for removing a sulfur-containing-gas exhibits sufficiently high sulfur-containing-gas removal performance.

Next, a mechanism of removing sulfur-containing-gas by such a first material for removing a sulfur-containing-gas will be discussed. Iodine supported on the porous support acts as a strong oxidizing agent on sulfur-containing-gas such as $SO_2$ and $H_2S$, to thereby oxidize the sulfur-containing-gas. Accordingly, $SO_2$ is oxidized to sulfuric acid ($H_2SO_4$), and $H_2S$ is oxidized to sulfur (S), for example. Then, the components such as sulfuric acid ($H_2SO_4$) and sulfur (S), which are oxidized as described above, are trapped by the porous support and removed. Meanwhile, when oxidizing the sulfur-containing-gas, iodine is converted into hydroiodic acid; however, hydroiodic acid is readily oxidized by oxygen as described above, and is reconverted into iodine. For this reason, even after the sulfur-containing-gas is removed, the sulfur-gas removal performance can be easily regenerated by, for example, the presence of air. As described above, the first material for removing a sulfur-containing-gas has a catalytic-like mechanism of removing sulfur-gas and is capable of exhibiting high gas-purification performance from the initial stage. Furthermore, in the first material for removing a sulfur-containing-gas, such a cyclic system as described above is established during the removal of the sulfur-containing-gas. Accordingly, unless the components such as sulfuric acid and sulfur, which are produced by oxidation of sulfur-containing gas such as $SO_2$ and $H_2S$, are excessively accumulated on the activated carbon, sufficiently high removal performance can be maintained and exhibited. The present inventors speculate that, for these reasons, it is possible in the present invention to sufficiently remove the sulfur-containing-gas by the former filter for a long period of time.

Meanwhile, the latter filter according to the present invention comprises the activated carbon fiber with the alkali component supported thereon. Such an activated carbon fiber has neither macropores nor mesopores, and thus the adsorption rates of sulfur-containing-gas thereto are fast. For this reason, in the present invention, a trace amount of sulfur-containing-gas which ooze out from the former filter can be adsorbed to the latter filter. Accordingly, extremely high sulfur-containing-gas removal performance is exhibited. The present inventors speculate that, since the filter for removing a sulfur-containing-gas of the present invention comprises the former filter and the latter filter as described above, the filter for removing a sulfur-containing-gas is capable of exhibiting sufficiently high removal performance (high removal ratio) of sulfur-containing-gas and is also capable of exhibiting the sufficiently high sulfur-containing-gas removal performance for a long period of time (life extension).

According to the present invention, it is possible to provide: a filter for removing a sulfur-containing-gas capable of exhibiting sufficiently high sulfur-containing-gas removal performance and also capable of exhibiting the sufficiently high sulfur-containing-gas removal performance for a long period of time; and a method for removing sulfur-containing-gas using the filter for removing a sulfur-containing-gas.

DETAILED DESCRIPTION OF THE PREFERRED EMBODIMENTS

Hereinafter, the present invention will be described in detail on the basis of preferred embodiments thereof.

First, a filter for removing a sulfur-containing-gas of the present invention will be described. Specifically, the filter for removing a sulfur-containing-gas of the present invention is a filter for removing a sulfur-containing-gas, which removes the sulfur-containing-gas by being brought into contact with the sulfur-containing-gas in a gas flow path, the filter comprising a former filter disposed on an upstream side of the gas flow path, and a latter filter disposed on a downstream side of the gas flow path, wherein the former filter comprises a first material for removing a sulfur-containing-gas, the first material comprising a porous support, and iodine which is supported on the porous support, and is produced by catalytic pyrolysis of ammonium iodide at a thermal decomposition ratio of 80% or more by use of the porous support as a catalyst, and the latter filter comprises a second material for removing a sulfur-containing-gas, the second material comprising an activated carbon fiber, and an alkali component which is supported on the activated carbon fiber.

Hereinafter, the preferred embodiments will be described in detail with reference to the drawings. Note that, in the following description and drawings, the same or corresponding components are denoted by the same reference symbols, and redundant description thereof is omitted.

Figure 1:
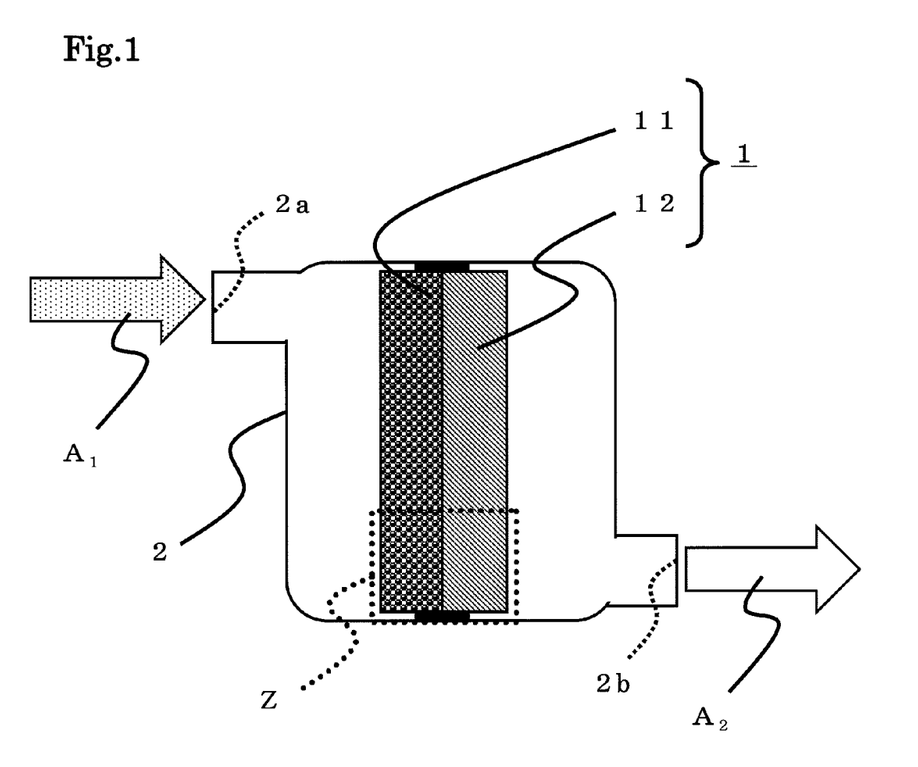
FIG. 1 is a longitudinal cross-sectional view showing an outline of a state where a filter for removing a sulfur-containing-gas, which is a preferred embodiment of a filter for removing a sulfur-containing-gas of the present invention, is placed in a case.
Figure 2:
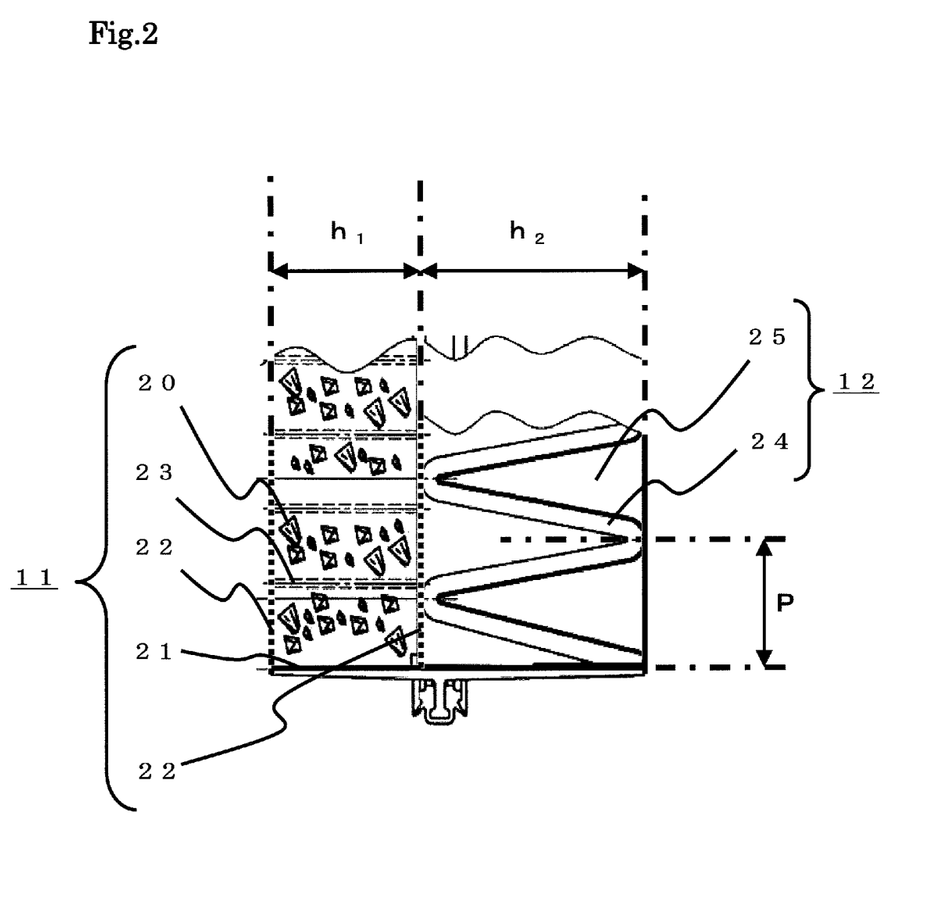
FIG. 2 is an enlarged schematic view showing the inside of a region Z of the filter for removing a sulfur-containing-gas, surrounded by the dotted line shown in FIG. 1.

FIG. 1 is a longitudinal cross-sectional view showing an outline of a state where a filter for removing a sulfur-containing-gas, which is a preferred embodiment of the filter for removing a sulfur-containing-gas of the present invention, is placed in a case. FIG. 2 is an enlarged schematic view schematically showing the inside of a region Z of the filter for removing a sulfur-containing-gas, surrounded by the dotted line shown in FIG. 1.

The filter for removing a sulfur-containing-gas 1 comprises a former filter 11 and a latter filter 12. In addition, the filter for removing a sulfur-containing-gas 1 is placed inside the case 2 provided with openings 2a and 2b each of which is connectable to a gas pipe or the like. This embodiment employs a structure in which all of the gas introduced through the opening 2a into the case 2 is passed through the filter for removing a sulfur-containing-gas 1, before discharged through the opening 2b. Meanwhile, the filter for removing a sulfur-containing-gas 1 has a structure in which the former filter 11 is provided on the upstream side of a gas flow path and the latter filter 12 is provided on the downstream side of the gas flow path. Note that arrows $A_1$ and $A_2$ in FIG. 1 respectively indicate gas flows of inlet gas and outlet gas.

The former filter 11 comprises a first material for removing a sulfur-containing-gas 20. The first material for removing a sulfur-containing-gas 20 is filled into a container constructed of a frame 21 and a mesh member 22. In this embodiment, mesh partition plates 23 for further evenly filling the first material for removing a sulfur-containing-gas 20 are disposed in the container. Meanwhile, the latter filter 12 comprises a second material for removing a sulfur-containing-gas 24 which is formed in a pleat shape. The second material for removing a sulfur-containing-gas 24 is bonded onto spacers 25 to keep the pleat shape. Note that, in this embodiment, a polypropylene (PP) case having dimensions of 200 mm in length, 200 mm in width and 150 mm in height is used as the case 2.

First, the former filter 11 will be described. The former filter 11 comprises the first material for removing a sulfur-containing-gas 20 is a first material for removing a sulfur-containing-gas comprising a porous support and iodine supported on the porous support. The iodine supported on the porous support is produced by catalytic pyrolysis of ammonium iodide at a thermal decomposition ratio of 80% or more by use of the porous support as a catalyst.

Such a porous support is not particularly limited, and, as the porous support, any publicly-known porous support (for example, an activated carbon, a silica gel, a zeolite, an activated alumina, or the like) used in a gas removing material or the like can be used as appropriate. Among these porous supports, an activated carbon is preferable from the viewpoint that higher sulfur-containing-gas removal performance is obtained. Such an activated carbon is not particularly limited, and any publicly-known activated carbon can be used as appropriate. It is preferable to use an activated carbon in which the proportion of the pore volume attributable to micropores with diameters of 2 nm or smaller is 90% or more relative to the total pore volume in the activated carbon. The activated carbon satisfying such a condition has a higher proportion of micropores, and thus has a strong effect of absorbing and concentrating the sulfur-containing-gas in the pores thereof. Accordingly, such an activated carbon can promote the catalytic effect of iodine, and can strongly hold the sulfur components such as sulfuric acid and sulfur produced by the reaction. As a result, such an activated carbon tends to be capable of exhibiting higher sulfur-containing-gas removal performance. In addition, a commercially available activated carbon (for example, a commercially available coconut-shell activated carbon or the like) may be used as the activated carbon. Additionally, the above-described activated carbon in which the proportion of the pore volume attributable to micropores with diameters of 2 nm or smaller is 90% or more relative to the total pore volume in the activated carbon includes, for example, a coconut-shell activated carbon. Note that the pore volume can be determined by a method known as a nitrogen adsorption method.

The shape of such an activated carbon is not particularly limited; however, such an activated carbon is preferably particulate, ground, or pelletized. When a particulate activated carbon is used, the particle diameter of the activated carbon is preferably approximately 1 to 5 mm. Further, from the viewpoint of bringing a higher sulfur-containing-gas removal capability, such an activated carbon preferably has a specific surface area of 500 to 2000 $m^2/g$.

The iodine supported on the porous support is produced by catalytic pyrolysis of ammonium iodide. The term "catalytic pyrolysis" in the present invention refers to a thermal decomposition reaction of ammonium iodide, the reaction proceeding by heating the porous support, on which the ammonium iodide is supported, the porous support serving as a catalyst. By this, iodine is produced, and remains supported on the porous support which has served as the catalyst. A specific reaction in such catalytic pyrolysis is as follows. Specifically, first, by heating the porous support supporting ammonium iodide, the ammonium iodide is decomposed, producing hydroiodic acid (HI) and ammonia ($NH_3$). Next, the hydroiodic acid is oxidized by oxygen, producing solid iodine ($I_2$). Note that the produced solid iodine remains supported on the porous support.

The iodine according to the present invention is produced by catalytic pyrolysis of ammonium iodide at a thermal decomposition ratio of 80% (more preferably 90%) or more. If such a thermal decomposition ratio is below the lower limit, the solid iodine ($I_2$) is not sufficiently produced, and the amount of iodine supported on the activated carbon decreases, consequently lowering the removal performance of the obtained material for removing a sulfur-containing-gas. Note that, in the present invention, the iodine is produced by the catalytic pyrolysis of ammonium iodide at the thermal decomposition ratio of 80% or more as described above. Accordingly, the grain growth of the iodine is sufficiently prevented. Thereby, the produced iodine takes a sufficiently fine particulate form, and supported on the porous support in a highly dispersed state. Moreover, the ammonium iodide, which would be a barrier to gas diffusion, disappears by the pyrolysis. The present inventors speculate that, for these reasons, it is possible for the obtained first material for removing a sulfur-containing-gas to exhibit sufficiently high removal performance.

Further, in the present invention, the amount of the iodine supported on the porous support is preferably 10 to 100 (more preferably 20 to 60) parts by mass relative to 100 parts by mass of the porous support. If such a supported amount of the iodine is below the lower limit, the sulfur-containing-gas removal performance tends to be insufficient. On the other hand, if such a supported amount of the iodine exceeds the upper limit, the supported amount is excessively so large that the porous support is obstructed, and thus the removal performance rather tend to be lower.

The size of the first material for removing a sulfur-containing-gas 20 is preferably 5 to 8 mesh in average particle diameter. If such an average particle diameter is below the lower limit, it tends to be difficult to hold the first material for removing a sulfur-containing-gas 20 in the frame by the mesh member 22. On the other hand, if such an average particle diameter exceeds the upper limit, the surface area of the former filter becomes too small, and the sulfur-containing-gas purification performances tend to be lowered. Note that, when the particles are not spherical, the particle diameter herein refers to, in principle, the average value of the smallest and the largest diameters of the particle.

When sulfur-containing-gas are removed by such a first material for removing a sulfur-containing-gas, the iodine acts as a strong oxidizing agent on the sulfur-containing-gas to thereby oxidize the sulfur-containing-gas, and the products produced in the oxidation are trapped by the porous support.

In this way, the sulfur-containing-gas is removed. Note that, when oxidizing sulfur-containing-gas, the iodine is converted into hydroiodic acid; however, hydroiodic acid is readily oxidized in the presence of oxygen, and is reconverted into iodine as described above. For example, suppose a case where $SO_2$ gas is removed. During the removal of the $SO_2$ gas, a cyclic system is established in which the reactions represented by the following reaction Formulas (1) and (2), respectively:

$$I_2 + SO_2 + 2H_2O \rightarrow H_2SO_4 + 2HI \tag{1}$$

$$2HI + 1/2 O_2 \rightarrow I_2 + H_2O \tag{2}$$

alternately occur. For this reason, in the present invention, unless the products produced by oxidation of sulfur-containing-gas (in the above example, $H_2SO_4$) are excessively accumulated on the porous support, sufficiently high removal performance can be maintained and exhibited.

Meanwhile, an example of a preferred method for producing such a first material for removing a sulfur-containing-gas 20 is a method comprising steps of:

obtaining a porous support supporting ammonium iodide by supporting, through impregnation, a solution containing ammonium iodide and a solvent on the support; and obtaining a material for removing a sulfur-containing-gas by heating the porous support supporting ammonium iodide under an oxygen-containing atmosphere at 80 to 115° C. for 5 hours or longer to produce iodine by catalytic pyrolysis of ammonium iodide with the porous support serving as a catalyst and to thereby support the iodine on the porous support. Each of these steps will be described below, separately.

In the preferred method for producing the first material for removing a sulfur-containing-gas 20, first, the porous support supporting ammonium iodide is obtained by supporting, through impregnation, the solution containing ammonium iodide and a solvent on the porous support (first step).

Such a solvent is not particularly limited, as long as the solvent can dissolve ammonium iodide. Water, an organic solvent, or the like can be used as appropriate, as the solvent. From the viewpoint of easiness in removing the solvent by vaporization in the step of heating, the solvent is preferably at least one selected from the group consisting of water, methanol, ethanol, and acetone.

The content of the ammonium iodide in the solution is not particularly limited; however, the content is preferably 5 to 60% by mass. If the content of the ammonium iodide is below the lower limit, the productivity of the material for removing a sulfur-containing-gas tends to be lowered. On the other hand, if the content of the ammonium iodide exceeds the upper limit, the particles of the ammonium iodide supported on the activated carbon become large and coarse, and the dispersibility of the iodine produced in the catalytic pyrolysis decreases. Thereby, sufficient gas removal performance is less likely to be obtained.

Furthermore, in the first step, it is preferable that the solution be supported by impregnation on the porous support in a condition that the supported amount of iodine is 10 to 100 parts by mass relative to 100 parts by mass of the porous support. Note that the "supported amount of iodine" herein is based on the amount of iodine produced by the catalytic pyrolysis to be described later.

In the preferred method for producing the first material for removing a sulfur-containing-gas, next, the material for removing a sulfur-containing-gas is obtained by heating the porous support supporting ammonium iodide under an oxygen-containing atmosphere at 80 to 115° C. for 5 hours or longer to produce iodine by catalytic pyrolysis of ammonium iodide with the porous support serving as a catalyst and to thereby support the iodine on the porous support (second step).

As the "oxygen-containing atmosphere" herein, a gas atmosphere in which the concentration of oxygen is 16% by volume or more (more preferably approximately 18 to 30% by volume) is preferable. If the oxygen concentration is below the lower limit, the productivity of iodine tends to be lowered. On the other hand, if the oxygen concentration exceeds the upper limit, there exists a tendency that the cost is increased and uneconomical. In other words, by performing the catalytic pyrolysis of ammonium iodide under a gas atmosphere at such an oxygen concentration mentioned above, the hydroiodic acid (HI) produced by the pyrolysis of ammonium iodide can be oxidized efficiently, and thereby iodine can be produced efficiently.

A method for setting the atmosphere during heating to be such an oxygen-containing atmosphere is not particularly limited. For example, a method may be employed in which the heating is performed in an open system in the air. Alternatively, a method may be employed in which the heating is performed while a gas containing oxygen (for example, air) is circulated. Among these methods for setting the atmosphere during heating to be such an oxygen-containing atmosphere, it is preferable that the porous support supporting ammonium iodide be heated while air is circulated, in order that the catalytic pyrolysis can proceed more efficiently. By performing the heating while air is circulated as described above, the solvent vaporized during the heating and the ammonia produced by the catalytic pyrolysis of ammonium iodide are prevented from remaining in pores of the porous support; and the decrease in oxygen concentration in the pores of the porous support is sufficiently prevented. Accordingly, there is a tendency that the catalytic pyrolysis proceeds efficiently in the pores and iodine is more efficiently produced. Moreover, a method for circulating air as described above is not particularly limited. For example, a method can be employed in which air is circulated by a publicly-known apparatus having a forced ventilation function.

The temperature condition in heating the porous support supporting ammonium iodide is 80 to 115° C. (more preferably 90 to 110° C.). If the heating temperature is below the lower limit, it becomes difficult to efficiently perform the catalytic pyrolysis, and the vaporization rate of the solvent decreases, thereby lowering the productivity. On the other hand, if the heating temperature exceeds the upper limit, the temperature reaches a far higher temperature than the melting point (approximately 114° C.) of iodine produced by the catalytic pyrolysis of ammonium iodide. As a result, the produced iodine melts, and the grain growth thereof occurs, lowering the removal performance of the obtained material for removing a sulfur-containing-gas. Note that, if the heating is performed at a temperature exceeding the boiling point of iodine (at a temperature of approximately 184° C. or higher), vaporization of iodine is significant. As a result, the supported amount of iodine is reduced, which result in a lower productivity and a lower economical efficiency. Moreover, there arises a problem of corrosion of the heating apparatus due to the iodine.

The heating time in heating the porous support supporting ammonium iodide is preferably 5 hours or longer (more preferably 6 to 48 hours, and further preferably 10 to 24 hours). If the heating time is below the lower limit, the heating time is insufficient, and the catalytic pyrolysis of ammonium iodide does not proceed sufficiently. Thus, the thermal decomposition ratio cannot reach 80% or more. On the other hand, if the heating time exceeds the upper limit, the subsequent heating lowers the economical efficiency.

In the present invention, the catalytic pyrolysis of ammonium iodide is performed under the oxygen-containing atmosphere and under the conditions of the heating temperature and the heating time. Thereby, the thermal decomposition ratio of ammonium iodide reaches 80% or more. By such catalytic pyrolysis, iodine is supported at a sufficient supported amount, and the grain growth of the iodine is sufficiently prevented. Accordingly, the iodine is supported on the porous support in the form of sufficiently fine particles while being highly dispersed. The present inventors speculate that, for these reasons, the obtained first material for removing a sulfur-containing-gas is capable of exhibiting sufficiently high removal performance.

The frame 21 is not particularly limited, and any publicly-known frame can be used as appropriate, as long as the first material for removing a sulfur-containing-gas can be filled into the frame. Moreover, the shape and the like of the frame are not particularly limited, and can be changed as appropriate for use depending on the intended design. The mesh member 22 is not particularly limited, as long as the mesh member is capable of holding the first material for removing a sulfur-containing-gas. The iodine supported on the porous support is a substance having a strong oxidizing power. Accordingly, as the frame 21 and the mesh member 22, ones formed of a highly chemical-resistant material are preferable, and ones which are formed of a fluorine resin (PTFE, PFA, or the like), a polyphenylene sulfide resin (PPS) or a polyethylene naphthalate resin (PEN) are preferable. The mesh size of the mesh member 22 is preferably 100 to 200 mesh, in order that the activated carbon can be securely held, and that foreign objects flowing thereinto from the outside do not clog the mesh member 22. Meanwhile, the partition plates 23 are not particularly limited; however, it is preferable to use the same material as that of the mesh member 22. Note that, in this embodiment, a 150-mesh PTFE mesh member having dimensions of 200 mm in length and 200 mm in width is used as the mesh member 22.

A preferred range of the filling height in the former filter 11 ($h_1$ in FIG. 2) varies depending on the design (the shape, the amount of the first material for removing a sulfur-containing-gas to be filled, or the like) of the former filter and the like. For this reason, its generalized preferred range cannot be stated. However, in consideration of the relationship between the removing efficiency of the sulfur-containing-gas and the pressure loss due to the first material for removing a sulfur-containing-gas, the filling height is preferably approximately 30 mm, in a case where the dimensions of each side are 200 mm in length and 200 mm in width. Note that, in this embodiment, the former filter 11 has dimensions of 200 mm in length, 200 mm in width and 30 mm in filling height ($h_1$), and has 600 g of the first material for removing a sulfur-containing-gas 20 filled therein.

Next, the latter filter will be described. In this embodiment, the latter filter 12 comprises the sheet-like second material for removing a sulfur-containing-gas 24 which is formed in a pleat shape. In addition, the second material for removing a sulfur-containing-gas 24 is bonded onto the spacers 25 to keep the pleat shape thereof.

Such a second material for removing a sulfur-containing-gas 24 comprises: a sheet-like activated carbon fiber which is formed in a pleat shape; and an alkali component supported on the activated carbon fiber. Such an activated carbon fiber is not particularly limited, and any publicly-known activated carbon fiber can be used as appropriate. Examples of the activated carbon fiber include sheets each made of an activated carbon fiber which is obtained by carbonizing and activating any one of polyacrylonitrile-based, pitch-based, phenol-based and rayon-based fibers. Note that, in this embodiment, a pitch-based activated carbon fiber sheet is used as the activated carbon fiber.

The mass per unit area of the activated carbon fiber varies depending on the shape or the like of the activated carbon fiber, and is not particularly limited. However, when the activated carbon fiber is a sheet-shaped and formed in a pleat shape, the mass per unit area is preferably 100 to 400 g/m$^2$, and more preferably 200 to 300 g/m$^2$. If such a mass per unit area is below the lower limit, the absorption performance of the sulfur-containing-gas tends to decrease. On the other hand, if such a mass per unit area exceeds the upper limit, the activated carbon fiber is too thick, and thereby pleat valleys are in close contact with each other, and the pressure loss tends to increase.

Further, when the activated carbon fiber is formed in a pleat shape, the pitch (P in FIG. 2) is preferably X/20 mm to X/10 mm, where X represents the numerical value of the mass per unit area. If such a pitch is below the lower limit, there is a tendency that the pleat valleys of the activated carbon fiber are in close contact with each other, and thereby the pressure loss increases. On the other hand, if the pitch exceeds the upper limit, there is a tendency that the filtration area decreases and the gas removal performance are lowered.

Moreover, when the activated carbon fiber is formed in a pleat shape, the folded width ($h_2$ in FIG. 2) is preferably 30 to 50 mm. If such a folded width is below the lower limit, there is a tendency that the filtration area decreases and the gas removal performance is lowered. On the other hand, if such a folded width exceeds the upper limit, there is a tendency that the pleat valleys of the activated carbon fiber are in close contact with each other, and thereby the pressure loss increases. Note that, used in this embodiment is a sheet made of an activated carbon fiber and is formed in a pleat shape of 200 mm in length, 200 mm in width, 50 mm in folded width ($h_2$), and 24 mm in pitch (P).

Meanwhile, the sheet thickness of the activated carbon fiber varies depending on the design of the latter filter 12 and the like, and hence not particularly limited. However, from the viewpoints of prevention of the increase in pressure loss and sufficient removal of the sulfur-containing-gas, when the activated carbon fiber is a pleat-shaped sheet of 200 mm in length and 200 mm in width, the sheet thickness is preferably approximately 1 to 5 mm.

The alkali component supported on the activated carbon fiber is not particularly limited, as long as the alkali component includes an alkali metal. Examples of the alkali component include a carbonate, hydrogen carbonate, hydroxide, or the like, of an alkali metal. From the viewpoint of efficient sulfur-containing-gas absorption, an alkali metal carbonate is preferably used. It is more preferable to use at least one selected from the group consisting of potassium carbonate, sodium carbonate and lithium carbonate.

The supported amount of such an alkali component is not particularly limited; however, the supported amount is preferably 1 to 100 parts by mass, and more preferably 5 to 60 parts by mass, relative to 100 parts by mass of the activated carbon fiber. If the supported amount of the alkali component is below the lower limit, the absorption performance of the sulfur-containing-gas tends to be lower. On the other hand, the supported amount exceeds the upper limit, there is a tendency that not only the absorption performance of the sulfur-containing-gas proportional to the supported amount cannot be obtained, but also the pores of the activated carbon fiber are obstructed and the removal performance rather become lower. Note that a method for supporting the alkali component on the activated carbon fiber is not particularly limited, and any publicly-known method can be employed as appropriate. In one example of such a method, an aqueous solution containing the alkali component is absorbed by the activated carbon fiber, and then the activated carbon fiber is dried.

Meanwhile, the spacers 25 are not particularly limited as long as the spacer is capable of keeping the shape of the second material for removing a sulfur-containing-gas 24 by bonding the second material for removing a sulfur-containing-gas 24 thereon, and a spacer made of any publicly-known material can be used as appropriate. Note that a method for bonding the second material for removing a sulfur-containing-gas to the spacers 25 is not particularly limited, and any publicly-known method can be used as appropriate. However, bonding with a hot-melt resin is preferable.

Note that, in such a latter filter 12, the activated carbon fiber has neither macropores nor mesopores, and thereby adsorption rates of the sulfur-containing-gas are fast. In addition, the alkali component acts like a neutralizing and absorbing agent. Accordingly, the sulfur-containing-gas can be easily absorbed and removed. The filter for removing sulfur containing gas 1 comprising the above former filter 11 and the above latter filter 12 is capable of exhibiting sufficiently high removal performance and is also capable of maintaining and exhibiting the sufficiently high sulfur-containing-gas removal performance for a long period of time.

Hereinabove, the preferred embodiment of the filter for removing a sulfur-containing-gas of the present invention has been described; however, the filter for removing a sulfur-containing-gas of the present invention is not limited to the above embodiment. For example, in the above embodiment, a former filter having dimensions of 200 mm in length, 200 mm in width and 30 mm in height is used as the former filter. However, in the present invention, the former filter needs to merely comprise the first material for removing a sulfur-containing-gas. Accordingly, the design of filter to be formed is not particularly limited, and various shapes and sizes can be employed. Note that, in the present invention, it is possible to use no frame and no mesh member, and to use a first material for removing a sulfur-containing-gas formed in a pellet shape as the former filter without any modification.

Meanwhile, in the above embodiment, the activated carbon fiber used in the latter filter 12 is formed in a pleat shape; however, the shape of the activated carbon fiber according to the present invention is not particularly limited, and can be changed as appropriate in accordance with an intended design. The shape may be a honeycomb shape, a tabular shape, or the like. Further, the size of the latter filter 12 is not particularly limited, and can be changed as appropriate in accordance with an intended design. In the above embodiment, the filter for removing a sulfur-containing-gas 1 comprises the former filter 11 and the latter filter 12 which are arranged in close contact with each other, as shown in FIG. 2. In the filter for removing a sulfur-containing-gas of the present invention, however, it is only necessary that the former filter be disposed on the upstream side of the gas flow path, and that the latter filter be disposed on the downstream side of the gas flow path. Accordingly, the filter for removing a sulfur-containing-gas may have a structure in which the former filter and the latter filter are disposed spaced away from each other.

Note that, such a filter for removing a sulfur-containing-gas of the present invention is capable of exhibiting sufficiently high sulfur-containing-gas removal performance as described above, and is also capable of exhibiting the performances for a long period of time. Accordingly, the filter for removing a sulfur-containing-gas of the present invention can be used suitably as, for example, a filter for removing a sulfur-containing-gas for a fuel cell, a filter for removing a sulfur-containing-gas for purification of combustion exhaust gas of a garbage incinerator, a boiler, or the like, and in other applications. In particular, the filter for removing a sulfur-containing-gas of the present invention is suitably used as a filter for removing a sulfur-containing-gas for a fuel cell.

Next, a method for removing sulfur-containing-gas of the present invention will be described. The sulfur-containing-gas removing method of the present invention is a method comprising a step of bringing sulfur-containing-gas into contact with the above filter for removing a sulfur-containing-gas of the present invention to thereby remove the sulfur-containing-gas.

In the method for removing sulfur-containing-gas of the present invention, the above filter for removing a sulfur-containing-gas of the present invention is used. Accordingly, when the sulfur-containing-gas is removed, first, the sulfur-containing-gas come into contact with the former filter disposed on the upstream side. In such a former filter, the iodine acts as a strong oxidizing agent on the sulfur-containing-gas to thereby readily oxidize the sulfur-containing-gas. The products produced in the oxidation are easily trapped by the activated carbon and removed. In addition, when a trace amount of sulfur-containing-gas which are not removed by the former filter ooze out, the trace amount of sulfur-containing-gas eventually come into contact with the latter filter. The activated carbon fiber in such a latter filter has neither macropores nor mesopores, and thereby the adsorption rates of the sulfur-containing-gas are fast in such a latter filter. Accordingly, the sulfur-containing-gas can be easily absorbed and removed. As a result, according to the sulfur-containing-gas removing method of the present invention, sulfur-containing-gas can be purified efficiently.

EXAMPLE

Hereinafter, the present invention will be described more specifically on the basis of Example and Comparative Examples; however, the present invention is not limited to the following Example.

Example 1

A filter for removing a sulfur-containing-gas having the above-described structure shown in FIG. 1 and FIG. 2 was produced. Note that a former filter and a latter filter had the following structures.

[Former Filter 11]
The amount of a first material for removing a sulfur-containing-gas (activated carbon supporting iodine) used: 600 g
The particle diameter of the first material for removing a sulfur-containing-gas: 2.8 to 4.7 mm (6.5 to 4 mesh) Filter dimensions: 200 mm in length, 200 mm in width, and 30 mm in height ($h_1$)
Mesh Member 22: PTFE (polytetrafluoroethylene), 100 mesh
[Latter Filter 12]
A second material for removing a sulfur-containing-gas (potassium carbonate-attached activated carbon fiber) Filter dimensions: 200 mm in length, 200 mm in width, 50 mm in folded width ($h_2$), and 24 mm in pitch (P).

In addition, the first material for removing a sulfur-containing-gas was produced as follows. Specifically, first, an ammonium iodide aqueous solution was prepared by dissolving 40 parts by mass of ammonium iodide in 70 parts by mass of water. Next, 110 parts by mass of the ammonium iodide aqueous solution was impregnated into 100 parts by mass of a coconut-shell activated carbon having particle diameters of 2.8 to 4.7 mm (manufactured by Cataler Corporation, under the trade name of "GA-5", with a specific surface area of 1000 $m^2/g$) Thus, an activated carbon supporting ammonium iodide was obtained. Then, the activated carbon supporting ammonium iodide was placed in a hot-air dryer having a forced ventilation function (capacity: 0.22 $m^3$), and heated for 48 hours under a temperature condition of 105° C., while air was introduced at a ventilation air flow rate of 1.5 $m^3$/min, so that the oxygen concentration in the gas atmosphere was 20% by volume or more during heating. Thus, the first material for removing a sulfur-containing-gas (activated carbon supporting iodine) was obtained. Note that the thermal decomposition ratio was 100%, and the supported amount of the iodine was 35 parts by mass relative to 100 parts by mass of the activated carbon.

Meanwhile, the second material for removing a sulfur-containing-gas was produced as follows. Specifically, first, prepared was a pitch-based activated carbon fiber formed into a pleat shape by pleat processing (200 mm in length, 200 mm in width, 50 mm in folded width ($h_2$), 24 mm in pitch (P), and 3 mm in sheet thickness). Next, a potassium carbonate aqueous solution ($K_2CO_3$: 10 parts by mass, and water: 30 parts by mass) was sprayed to 100 parts by mass of the activated carbon fiber with a spray, and thereby potassium carbonate was supported thereon. Thus, the second material for removing a sulfur-containing-gas (potassium carbonate-attached activated carbon fiber) was obtained. Note that, in the latter filter, the second material for removing a sulfur-containing-gas thus formed was bonded onto cardboard spacers with a hot-melt resin in order to keep the pleat shape thereof.

Comparative Example 1

A filter for removing a sulfur-containing-gas for comparison was produced in the same manner as in Example 1, except that an activated carbon supporting potassium carbonate (potassium carbonate-supporting activated carbon) was used in place of the first material for removing a sulfur-containing-gas of the former filter.

Note that the activated carbon supporting potassium carbonate was produced as follows. Specifically, first, a potassium carbonate aqueous solution was prepared by dissolving 40 parts by mass of potassium carbonate in 70 parts by mass of water. Next, 110 parts by mass of the potassium carbonate aqueous solution was impregnated into 100 parts by mass of a coconut-shell activated carbon having particle diameters of 2.8 to 4.7 mm (manufactured by Cataler Corporation, under the trade name of "GA-5", with a specific surface area of 1000 $m^2/g$). Thus, an activated carbon supporting potassium carbonate was obtained. Then, the activated carbon supporting potassium carbonate was heated at 105° C. for 17 hours by using a generally-used dryer not having a forced ventilation function (capacity: 0.077 $m^3$). Thus, the activated carbon supporting potassium carbonate was obtained. Note that the supported amount of potassium carbonate was 40 parts by mass relative to 100 parts by mass of the activated carbon, and 600 g thereof was used in the filter.

<Performance Evaluation of Filters for a Sulfur-Containing-Gas Obtained in Example 1 and Comparative Example 1>

<$SO_2$ Removal Performance Test>

Figure 3:
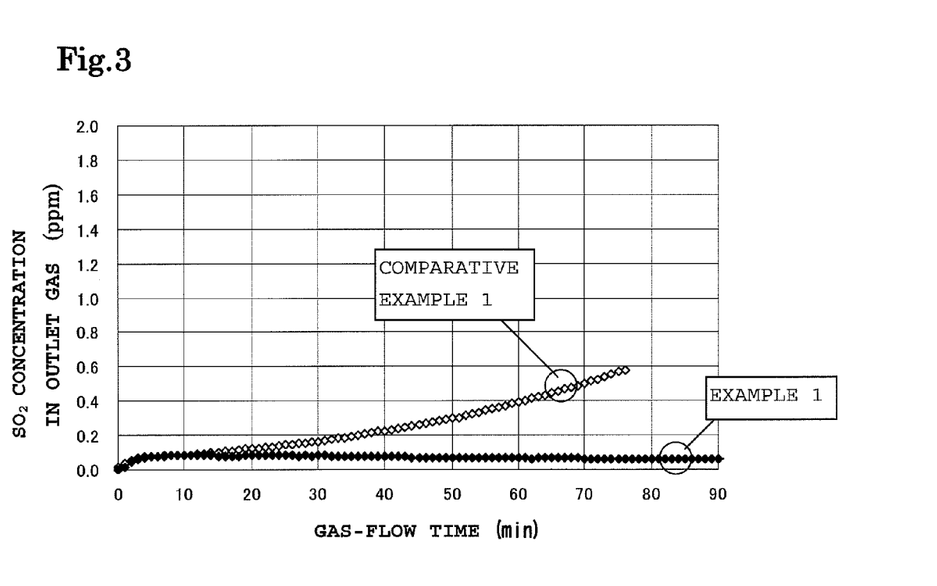
FIG. 3 is a graph showing a relationship between a flow time of gas passed through a filter for a sulfur-containing-gas obtained in each of Example 1 and Comparative Example 1 and a $SO_2$ concentration in an outlet gas.

By using each of the filters for removing a sulfur-containing-gas obtained in Example 1 and Comparative Example 1, the $SO_2$ removal performance of the filter for removing a sulfur-containing-gas was tested. Specifically, through an opening 2a as shown in FIG. 1, air containing $SO_2$ at a concentration of 5 ppm (23° C., relative humidity of 50% RH: inlet gas $A_2$) was flowed at a gas flow rate of 4 $m^3$/min. Then, the air passed through the filter for removing a sulfur-containing-gas 1. Thereafter, the $SO_2$ concentration in outlet gas ($A_2$) discharged through an opening 2b was determined. FIG. 3 shows a graph showing the relationship between the gas flow time and the $SO_2$ concentration in the outlet gas.

As apparent from the results shown in FIG. 3, it was verified that the filter for removing a sulfur-containing-gas of the present invention (Example 1) is capable of exhibiting a high sulfur-containing-gas removal performance from the beginning and is also capable of exhibiting sufficiently the high sulfur-containing-gas removal performance for a long period of time. In contrast, it was found out that the filter for removing a sulfur-containing-gas for comparison (Comparative Example 1) does not have a sufficient sulfur-containing-gas removal performance, since the $SO_2$ concentration in the outlet gas increased with time.

<$H_2S$ Removal Performance Test>

Figure 4:
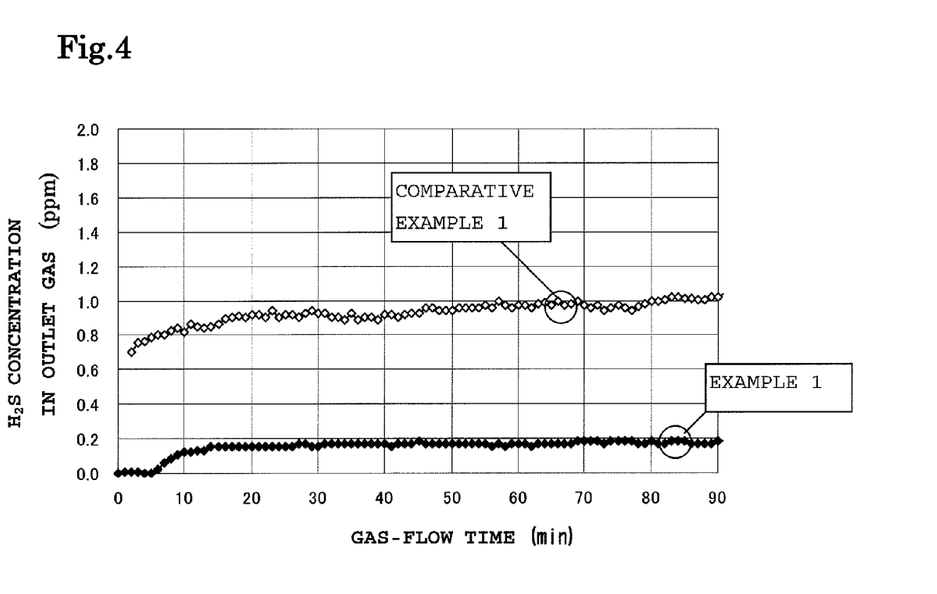
FIG. 4 is a graph showing a relationship between a flow time of gas passed through the filter for a sulfur-containing-gas obtained in each of Example 1 and Comparative Example 1 and a $H_2S$ concentration in an outlet gas.

The $H_2S$ concentration in the outlet gas ($A_2$) was determined by employing the same method as in the above $SO_2$ removal performance test, except that air containing $H_2S$ at a concentration of 5 ppm was flowed as the inlet gas ($A_2$) in place of the air containing $SO_2$ at a concentration 5 ppm. FIG. 4 shows a graph showing the relationship between the gas flow time and the $H_2S$ concentration in the outlet gas.

As apparent from the results shown in FIG. 4, it was verified that the filter for removing a sulfur-containing-gas of the present invention (Example 1) is capable of exhibiting a high sulfur-containing-gas removal performance on $H_2S$ from the beginning and is also capable of exhibiting sufficiently the high sulfur-containing-gas removal performance for a long period of time. In contrast, it was found out that the filter for removing a sulfur-containing-gas for comparison (Comparative Example 1) does not have a sufficient removal performance on $H_2S$ from the beginning.

Comparative Example 2

A filter for removing a sulfur-containing-gas for comparison was produced in the same manner as in Example 1, except that an iodine-attached activated carbon for comparison (iodine thereof was produced by catalytic pyrolysis of ammonium iodide at a thermal decomposition ratio of 28.0%) was used in place of the first material for removing a sulfur-containing-gas.

Note that the iodine-attached activated carbon for comparison was prepared by the same method as the producing method of the first material for removing a sulfur-containing-gas employed in Example 1, except that the heating time was 3 hours. In addition, the thermal decomposition ratio in this time was 28.0%, the supported amount of iodine was 9.8 parts by mass relative to 100 parts by mass of the activated carbon, and 600 g of the iodine-attached activated carbon was used in the filter.

The $SO_2$ removal performance test and the $H_2S$ removal performance test were conducted on the filter for removing a sulfur-containing-gas obtained in Comparative Example 2 by employing the same methods as described above. The results of these tests showed that the filter for removing a sulfur-containing-gas obtained in Comparative Example 2 does not have sufficient $SO_2$ and $H_2S$ removal performance, when compared with the filter for removing a sulfur-containing-gas obtained in Example 1.

INDUSTRIAL APPLICABILITY

As have been described above, the present invention makes it possible to provide: a filter for removing a sulfur-containing-gas capable of exhibiting sufficiently high sulfur-containing-gas removal performance and also capable of exhibiting the sufficiently high sulfur-containing-gas removal performance for a long period of time; and a method for removing sulfur-containing-gas using the filter for removing a sulfur-containing-gas.

Accordingly, since the filter for removing a sulfur-containing-gas of the present invention is capable of exhibiting sulfur-containing-gas removal performance for a long period of time, the filter for removing a sulfur-containing-gas is particularly useful as a filter for removing a sulfur-containing-gas for a fuel cell, a filter for removing a sulfur-containing-gas for purification of combustion exhaust gas of a garbage incinerator, a boiler, or the like, and in other applications.

The invention claimed is:

1. A filter for removing a sulfur-containing-gas, which removes the sulfur-containing-gas by being brought into contact with the sulfur-containing-gas in a gas flow path, the filter comprising a former filter disposed on an upstream side of the gas flow path, and a latter filter disposed on a downstream side of the gas flow path, wherein
   the former filter comprises a first material for removing a sulfur-containing-gas, the first material comprising a porous support, and iodine which is supported on the porous support, and is produced by catalytic pyrolysis of ammonium iodide at a thermal decomposition ratio of 80% or more by use of the porous support as a catalyst, and
   the latter filter comprises a second material for removing a sulfur-containing-gas, the second material comprising an activated carbon fiber, and an alkali component which is supported on the activated carbon fiber.

2. The filter for removing a sulfur-containing-gas according to claim 1, wherein the iodine is produced by the catalytic pyrolysis of ammonium iodide at the thermal decomposition ratio of 90% or more by use of the porous support as the catalyst.

3. The filter for removing a sulfur-containing-gas according to claim 1, wherein the porous support is an activated carbon.

4. The filter for removing a sulfur-containing-gas according to claim 1, wherein the porous support is an activated carbon in which a proportion of a pore volume attributable to micropores with diameters of 2 nm or smaller is 90% or more relative to a total pore volume in the activated carbon.

5. The filter for removing a sulfur-containing gas according to claim 1, wherein a supported amount of the iodine is 10 to 100 parts by mass relative to 100 parts by mass of the porous support.

6. The filter for removing a sulfur-containing-gas according to claim 1, wherein a supported amount of the iodine is 20 to 60 parts by mass relative to 100 parts by mass of the porous support.

7. The filter for removing a sulfur-containing-gas according to claim 1, wherein the alkali component is at least one selected from the group consisting of potassium carbonate, sodium carbonate and lithium carbonate.

8. The filter for removing a sulfur-containing-gas according to claim 1, wherein a supported amount of the alkali component is 1 to 100 parts by mass relative to 100 parts by mass of the activated carbon fiber.

9. The filter for removing a sulfur-containing-gas according to claim 1, wherein a supported amount of the alkali component is 5 to 60 parts by mass relative to 100 parts by mass of the activated carbon fiber.

10. A method for removing a sulfur-containing-gas, comprising:
    bringing the sulfur-containing-gas into contact with a filter for removing a sulfur-containing-gas that includes a former filter disposed on an upstream side of a gas flow path of the sulfur-containing-gas, and a latter filter disposed on a downstream side of the gas flow path, wherein
    the former filter comprises a first material for removing a sulfur-containing-gas, the first material comprising a porous support, and iodine which is supported on the porous support, and is produced by catalytic pyrolysis of ammonium iodide at a thermal decomposition ratio of 80% or more by use of the porous support as a catalyst, and
    the latter filter comprises a second material for removing a sulfur-containing-gas, the second material comprising an activated carbon fiber, and an alkali component which is supported on the activated carbon fiber
    to thereby remove the sulfur-containing-gas.

\* \* \* \* \*